US006236647B1

United States Patent
Amalfitano

(10) Patent No.: US 6,236,647 B1
(45) Date of Patent: May 22, 2001

(54) DYNAMIC FRAME SIZE ADJUSTMENT AND SELECTIVE REJECT ON A MULTI-LINK CHANNEL TO IMPROVE EFFECTIVE THROUGHPUT AND BIT ERROR RATE

(75) Inventor: Carlo Amalfitano, Melbourne Beach, FL (US)

(73) Assignee: Tantivy Communications, Inc., Melbourne, FL (US)

( * ) Notice: Subject to any disclaimer, the term of this patent is extended or adjusted under 35 U.S.C. 154(b) by 0 days.

(21) Appl. No.: 09/030,049

(22) Filed: Feb. 24, 1998

(51) Int. Cl.[7] ...................................... H04J 13/00
(52) U.S. Cl. .................. 370/335; 370/329; 370/336; 370/230; 370/233; 370/235
(58) Field of Search ...................... 370/104, 314, 370/545, 505, 230, 233, 110, 235, 324, 329, 335, 336, 342, 464, 465, 470, 471, 431, 437, 441, 442, 458, 351, 352, 389

(56) References Cited

U.S. PATENT DOCUMENTS

| | | | |
|---|---|---|---|
| 4,107,469 | * 8/1978 | Jenkins | 370/505 |
| 4,577,316 | * 3/1986 | Schiff | 370/104 |
| 4,625,308 | 11/1986 | Kim et al. | 370/104 |
| 4,862,453 | * 8/1989 | West et al. | 370/314 |
| 4,866,709 | 9/1989 | West et al. | 370/82 |
| 5,027,348 | 6/1991 | Curry, Jr. | 370/85.1 |
| 5,115,309 | 5/1992 | Hang | 358/133 |
| 5,394,473 | 2/1995 | Davidson | 381/36 |
| 5,663,958 | 9/1997 | Ward | 370/347 |
| 5,699,364 | * 12/1997 | Sato et al. | 371/5.5 |
| 5,781,542 | 7/1998 | Tanaka et al. | 370/342 |

FOREIGN PATENT DOCUMENTS

| | | |
|---|---|---|
| 0 443 061 A1 | 8/1991 | (EP) . |
| 0 635 949 A1 | 1/1995 | (EP) . |
| 2 761 557 | 10/1998 | (FR) . |
| WO 97/23073 | 6/1997 | (WO) . |
| WO 97/46044 | 12/1997 | (WO) . |

OTHER PUBLICATIONS

Shacham, et al., "A Selective–Repeat–ARQ Protocol for Parallel Channels and Its Resequencing Analysis," *IEEE Transactions On Communications*, XP000297814, 40 (4) : 773–782 (Apr. 1992).

* cited by examiner

*Primary Examiner*—Dang Ton
*Assistant Examiner*—Anthony Ton
(74) *Attorney, Agent, or Firm*—Hamilton, Brook, Smith & Reynolds, P.C.

(57) ABSTRACT

A technique for implementing a sublayer of a protocol suitable for data transfer in a multichannel environment where each channel is assumed to be prone to a significant bit error rate such as in a wireless communication system. The invention may be used to provide a high speed data transfer such as at 128 kilobits per second or higher with a bit error rate of $10^{-6}$ or better using multiple channels. By keeping track of the number of frames received in error, the sender dynamically adjusts the subframe size for each channel to optimize the effective overall throughput. The subframes each carry preferably two types of sequence numbers including a position number related to an index into a larger frame to be transmitted as a single data entity. The second sequence number is related to the subchannel used so that the receiver can detect missing subframes. This then enables the receiver to submit retransmission requests for the missing pieces which can then be transmitted on the same channel or on another channel.

19 Claims, 9 Drawing Sheets

Sub-Frame Structure

| Field | Proposed Number of Bits |
|---|---|
| Data/Command Indicator | 1 |
| Large Frame sequence number (Window of 2) | 1 |
| Character offset of sub-frame into large frame | 11 |
| Sub-Channel sequence number (Window of 7) | 3 |
| Data | 0 to 2048 |
| CRC | 12 |
| Shared Flag (Hex 7E) | 8 |

This sub-frame structure is suitable for sub-channel utilization (Multi-link) use on media with high Bit Error Rates (BER)

FIG. 8

DYNAMIC FRAME SIZE ADJUSTMENT AND SELECTIVE REJECT ON A MULTI-LINK CHANNEL TO IMPROVE EFFECTIVE THROUGHPUT AND BIT ERROR RATE

BACKGROUND OF THE INVENTION

The widespread availability of personal computers at low cost has lead to a situation where the general public increasingly demands access to the Internet and other computer networks. A similar demand exists for wireless communications in that the public increasingly demands that cellular telephones be available at low cost with ubiquitous coverage.

As a result of their familiarity with these two technologies, the general population now increasingly wishes to not only have access to computer networks, but also wishes to access such networks in wireless fashion as well. This is of particular concern for the users of portable computers, laptop computers, hand-held personal digital assistants (PDAs), and the like, who would prefer and indeed now expect to be able to access such networks with the same convenience they have grown accustom to when using their cellular telephones.

Unfortunately, there is still no widely available satisfactory solution for providing low cost, high speed access to the Internet and other networks using the existing wireless infrastructure which has been built at some expense to support cellular telephony. Indeed, at the present time, the users of wireless modems that operate with the existing cellular telephone network often experience a difficult time when trying to, for example, use the Internet to view web pages. The same frustration level is felt in any situation when attempting perform other tasks that require the transfer of relatively large amounts of data between computers.

This is at least in part due to the architecture of cellular telephone networks, which were originally designed to support voice communications, as compared to the communication protocols in use for the Internet, which were originally optimized for wireline communication. In particular, the protocols used for connecting computers over wireline networks do not lend themselves well to efficient transmission over standard wireless connections.

For example, cellular networks were originally designed to deliver voice grade services, having an information bandwidth of approximately three kilohertz (kHz). While techniques exist for communicating data over such radio channels at rate of 9600 kilo bits per second (kbps), such low frequency channels do not lend themselves directly to transmitting data at rates of 28.8 kbps or even the 56.6 kbps that is now commonly available using inexpensive wireline modems. These rate are presently thought to be the minimum acceptable data rates for Internet access.

This situation is true for advanced digital wireless communication protocols as well, such as Code Division Multiple Access (CDMA). Even though such systems convert input voice information to digital signals, they were also designed to provide communication channels at voice grade bandwidth. As a result, they have been designed to use communication channels that may exhibit a bit error rate (BER) of as high as approximately one in one thousand bits in multipath fading environments. While such a bit error rate is perfectly acceptable for the transmission of voice signals, it becomes cumbersome for most data transmission environments.

Such a high bit error rate is certainly unacceptable for Internet type data transmissions. For example, the Transmission Control Protocol/Internet Protocol (TCP/IP) standard in use for Internet air transmission uses a frame size of 1480 bits. Thus, if a bit error is received in every frame, such as detected by a frame check sequence, it would appear as though every single frame might have to be re-transmitted in certain applications.

SUMMARY OF THE INVENTION

The present invention is implemented via a protocol converter disposed between a physical communication layer, such as may be associated with implementing a wireless communication protocol, and a network layer, such as may be associated with implementing a network protocol.

The protocol converter first splits messages in the form of network layer frames into multiple subframes prior to formatting them for transmission. The subframes are each assigned a position number such that they may be reassembled into the proper order to reconstruct the network layer frame at the receiver end.

The protocol preferably makes use of multiple physical layer connections such as radio links as needed to transmit the subframes at an overall desired data transmission rate. When this is the case, a link sequence identifier is added to identify the order in which the subframes are sent over a given sub-channel in a link.

On the receiver side, the subframes are then reassembled into the network layer frames using the subframe position numbers, and then passed the reassembled frame up to the network layer. Thus, the receiver side includes a protocol converter that performs the inverse function.

The protocol converters at both the sender and receiver also take steps to automatically and dynamically adjust the size of the subframes based upon an observed rejected subframe rate in order to optimize overall throughput. An average rate at which frames are rejected can be determined by counting good subframes and bad subframes. For example, at the receive end, a subframe with a bad cyclic redundancy check code (CRC) is discarded and counted as a bad subframe. By keeping track of the sequence numbers of the good subframe received, the receiver can determine that a particular subframe sequence number, namely the frame with the sequence number between the last good frame and the next good frame is missing. The receiver then explicitly requests retransmission of the bad frame by sequence number. This so called selective reject feature of the transmission permits both the receiver and the sender to know the number of frames received in error from the tally of selective reject orders.

From the count of the number of frames sent and the number of selective reject order received, the sender then dynamically adjusts the size of later transmitted subframes. Preferably, the subframe size is adjusted based upon a formula which depends upon the ratio of the actual data transferred to the number of bits actually used to carry the transmission, including the frame overhead and re-transmissions. For example, the number of data bytes, X, in a given subframe can be adjusted according to the formula:

$$X = -H + \sqrt{(X_{current} + H_{current}) * H / R}$$

where H is the new frame overhead, in bytes, including any shared frame synchronization flag (7E) between frames, $X_{current}$ and $H_{current}$ are, respectively, the immediately prior values of X and H, and R is a ratio of the observed number of frames transmitted successfully to the number of frames that are not transmitted successfully.

Particularly noisy channels may be subjected to down speed procedures or error coding techniques in order to improve the bit error rate observed in a particular channel.

In order to optimize throughput on overall basis, the subframe size calculation is preferably carried out on each channel separately. Otherwise, any good channels, that is, those channels which do not experience particularly noisy environments, might suffer down speed procedures needed to accommodate the weakest channels.

In one specific embodiment of the invention, the physical layer radio links may be implemented as 9.6 kbps channels such as can be reliably provided using CDMA cellular protocols and subchannel coding techniques.

The invention is particularly advantageous in environments such as requiring the communication of TCP/IP protocols since the number of channels needed to carry a single data stream at burst rates of 56.6 or 128 kbps can be quite large. For example, carrying such TCP/IP frames at these data rates may require up to and including 20 channels operating at 9.6 kbps. Because the probability of at least one relatively weak channel may be significant, by optimizing the throughput of each channel separately, the invention obtains the best overall system throughput in such environments. Simulations of the implementation of the invention indicate that it may be used to provide data rates such as 128 kbps with a bit error rate of $10^{-6}$ or better.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 8 is a diagram of one particular embodiment of a subframe according to the invention.

DETAILED DESCRIPTION OF A PREFERRED EMBODIMENT

Figure 1:
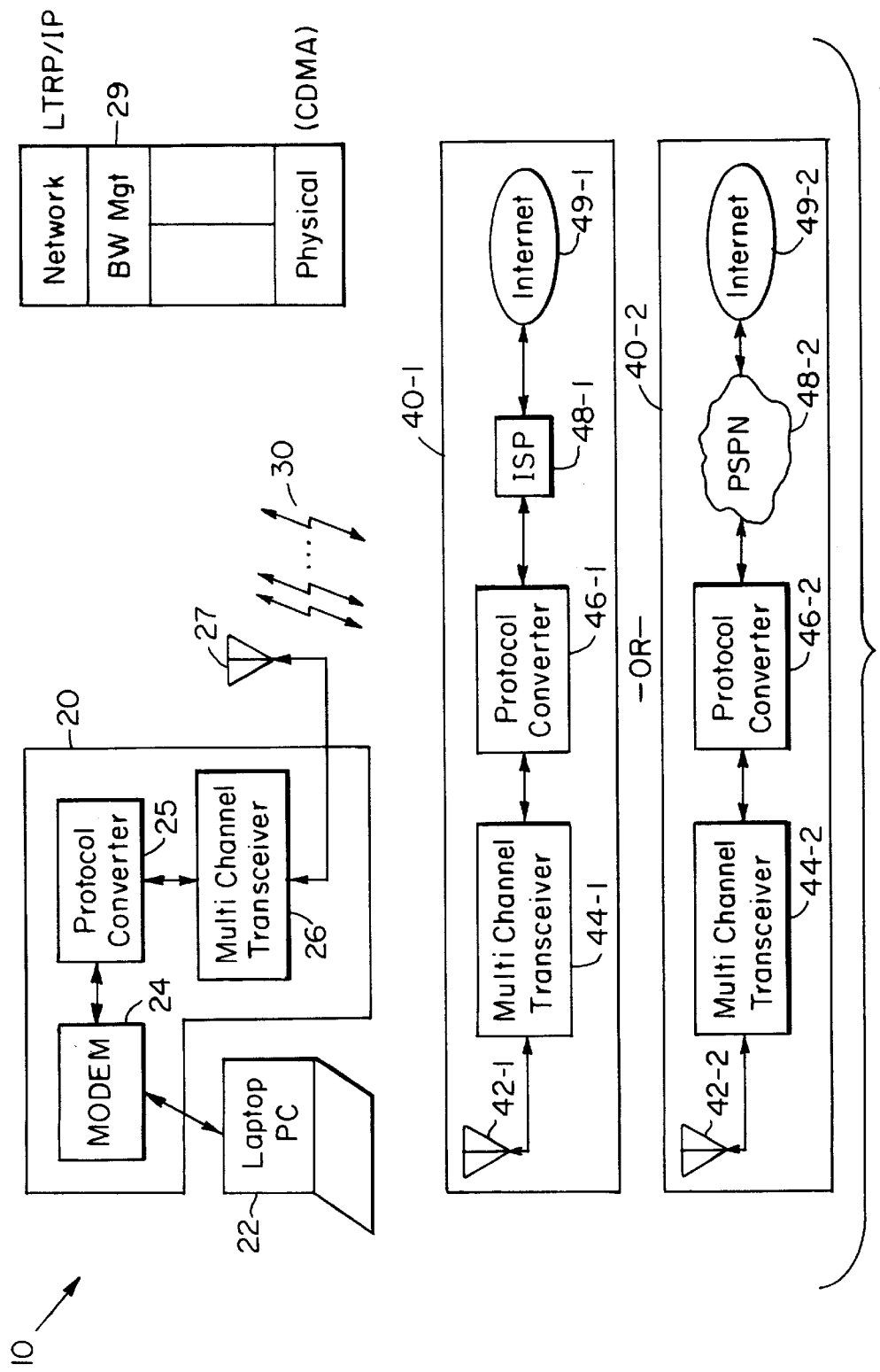
FIG. 1 is a block diagram of a system in which a portable device such a laptop computer is making use of a protocol converter according to the invention to connect to a computer network over a wireless link.

Turning attention now to the drawings more particularly, FIG. 1 is a block diagram of a system 10 for implementing high speed data communication according to the invention. The system 10 consists of a remote or subscriber unit 20, multiple bidirectional communication links 30, and a local or service provider unit 40.

The subscriber unit 20 connects to terminal equipment 22 such as a portable or laptop computer, hand held Personal Digital Assistant (PDA) or the like, via a modem 24. The modem 24 in turn provides data to a protocol converter 25, which in turn provides data to a multichannel digital transceiver 26 and antenna 27.

The modem 24 receives data from the terminal equipment 22, and together with appropriate hardware and/or software, converts it to a format suitable for transmission such as in accordance with known communication standards. For example, the modem 24 may convert data signals from the terminal equipment 22 to a wireline physical layer protocol format such as specified by the Integrated Services Digital Network (ISDN) standard at rates of 128 kbps, or the Kflex standard at rates of 56.6 kbps. At a network layer, the data provided by the modem is preferably formatted in a manner consistent with suitable network communication protocols such as TCP/IP to permit the terminal equipment 22 to connect to other computers over networks such as the Internet. This description of the modem 24 and protocols is exemplary only and it should be understood that other protocols can be used.

The protocol converter 25 implements an intermediate protocol layer suitable for converting the data provided by the modem 24 to a format appropriate for the multichannel transceiver 26 according to the invention, and as will be described in much grater detail below.

The multichannel digital transceiver 26 provides access to one or more physical communication links such as the illustrated radio channels 30. The physical links are preferably known wireless communication air interfaces using digital modulation techniques such as Code Division Multiple Access (CDMA) standard specified by IS-95. It should be understood that other wireless communication protocols and other types of links 30 may also be used to advantage with the invention.

The channels 30 represent one or more relatively slower communication channels, such as operating at a 9.6 kbps rate typical of voice grade communication. These communications channels may be provided by a single wide bandwidth CDMA carrier such as having a 1.25 MegaHertz bandwidth, and then providing the individual channels with unique orthogonal CDMA codes. Alternatively, the multiple channels 30 may be provided by single channel communication media such as provided by other wireless communication protocols. However, what is important is that the net effect is that the channels 30 represent multiple communication channels that may be adversely effected by significant bit error rates that are unique to each link 30.

An "error" as described herein is a bit error perceived at the higher layer such as the network layer. The invention only strives to improve the system level bit error rate, and does not attempt to guarantee absolute data integrity.

On the local, the service provider equipment 40 may for example be implemented at a wireless Internet Service Provider (ISP) 40-1. In this case, the equipment includes an antenna 42-1, a multichannel transceiver 44-1, a protocol converter 46-1, and other equipment 48-1 such as modems, interfaces, routers, and the like which are needed for the ISP to provide connections to the Internet 49-1.

At the ISP 40-1, the multichannel transceiver 44-1 provides functions analagous to the multichannel transceiver 26 of the subscriber unit, but in an inverse fashion. The same is true of the protocol converter 46-1, that is, it provides inverse functionality to the protocol converter 25 in the subscriber unit 20. The ISP 40-1 accepts data from the protocol converter 46-1 in the TCP/IP frame format and then communicates such data to the Internet 49-1. It should be understood that the configuration of the remaining ISP equipment 48-1 may take any number of forms such as a local area networks, multiple dial up connections, T1 carrier connection equipment, or other high speed communication links to the Internet 49-1.

Alternatively, the provider 40 may function as a radio base station in a cellular telephone system to permit a dial-up connection between the terminal equipment 22 and a server 49-2. In this instance, the base station 40-2 includes an antenna 42-2, multichannel transceiver 44-2, and protocol converter 46-2 providing with one or more connections to a public switched telephone network (PSTN) 48-2, and ultimately to the server 49-2.

In addition to the illustrated implementations 40-1, 40-2, there may be various other ways of implementing the provider 40 in order to provide a connection to data processing equipment from the terminal equipment 22.

Turning attention now to the functions of the protocol converters 25 and 46, can be thought of as intermediate layer within the context of the Open System Interconnect (OSI) model for communication. In particular, the protocol converter provides a bandwidth management functionality 29 implemented between a physical layer such as provided by the CDMA protocol in use with the multichannel transceivers 26 and a network layer protocol such as TCP/IP providing connections between the terminal equipment 22 and the Internet 49-1 or server 49-2.

The bandwidth management functionality 29 preferably provides a number of functions in order to keep both the physical layer and network layer connections properly maintained over multiple communication links 30. For example, certain physical layer connections may expect to receive a continuous stream of synchronous data bits regardless of whether terminal equipment at either end actually has data to transmit. Such functions may also include rate adaption, bonding of multiple channels on the links, spoofing, radio channel setup and takedown. The details for implementing a protocol converter specifically for ISDN terminal equipment 22 and Code Division Multiple Aaccess (CDMA) modulation techniques in use by the multichannel transceiver 26 are more specifically described in a pending patent application by Thomas E. Gorsuch and Carlo Amalfitano, entitled "Protocol Conversion and Bandwidth Reduction Technique Providing Multiple nB+D ISDN Basic Rate Interface Links Over A Wireless Code Division multiple Access Communication System", filed Dec. 17, 1997 and given Ser. No. 08/992,759, which is assigned to H.Q. Wireless, Inc., the assignee of the present application, and which application is hereby incorporated by reference.

The present invention is more particularly concerned with the technique used by the protocol converters 25 and 46 for adjusting the frame size of individual channels used over each of the multiple links 30 in order to improve the effective throughput rate between a sender and a receiver in a bit error rate prone environment. It should be understood in the following discussion that the connections discussed herein are bidirectional, and that a sender may either be the subscriber unit 20 or the provider unit 40.

Figure 2:
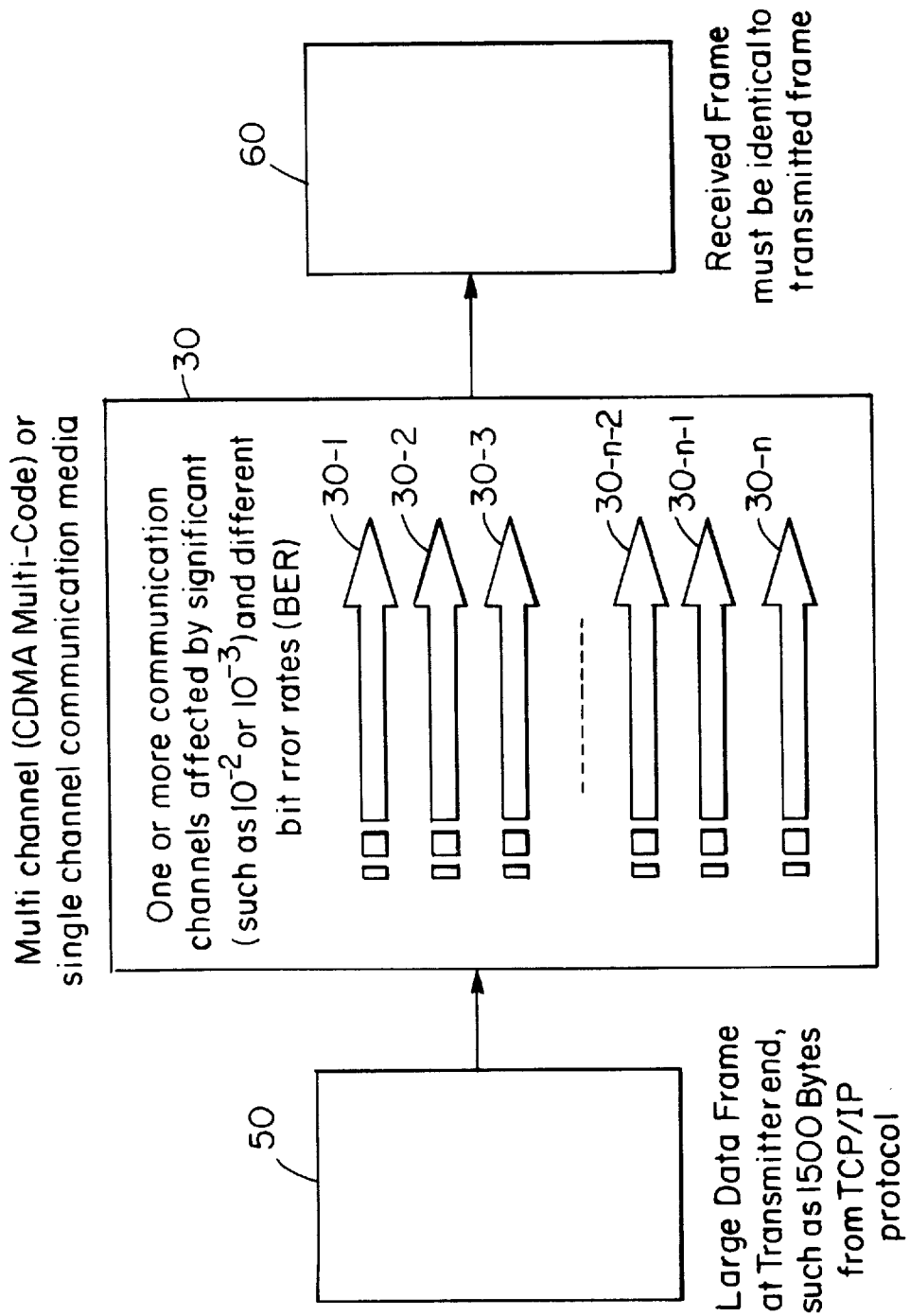
FIG. 2 is a diagram depicting how network layer data frames are divided among multiple physical links or channels.

More specifically, the problem addressed by the present invention is shown in FIG. 2. The frame 60 as received at the receiver end must be identical to the frame 50 originating at the sender. This is despite the fact that multiple channels are used with much higher bit error rates with the received frame 60 being transmitted reliably with a bit error rate of $10^{-6}$ or better as is typically required in TCP/IP or other network layer protocols. The present invention optimizes the effective data throughput such that the received frames 60 are not affected by the experienced bit error rate performance of network layer connections.

It should be understood that another assumption is that the individual channels 30-1, 30-2 . . . 30-N may experience different bit error rate levels both over time and in an average sense. Although each of the channels 30 may operate quite similarly, given the statistical nature of errors, identical behavior of all of the channels 30 is not assumed. For example, a specific channel 30-3 may receive severe interference from another connection in a neighboring cell, and be capable of providing only a $10^{-3}$ whereby other channels 30 may experience very little interference.

In order to optimize the throughput for the system 10 on a global basis, the invention also preferably optimizes the parameters of each channel 30 separately. Otherwise, a relatively good channel 30-1 might suffer down speed procedures required to accommodate a weaker channel 30-3.

It should also be understood that the number of channels 30 that may be needed to carry a single data stream such as a rate of 128 kbps at a given point in time may be relatively large. For example, up to 20 channels 30 may be assigned at a particular time in order to accommodate a desired data transfer rate. Therefore, the probability of different characteristics in any given one of the channels 30 is significantly different.

Figure 3:
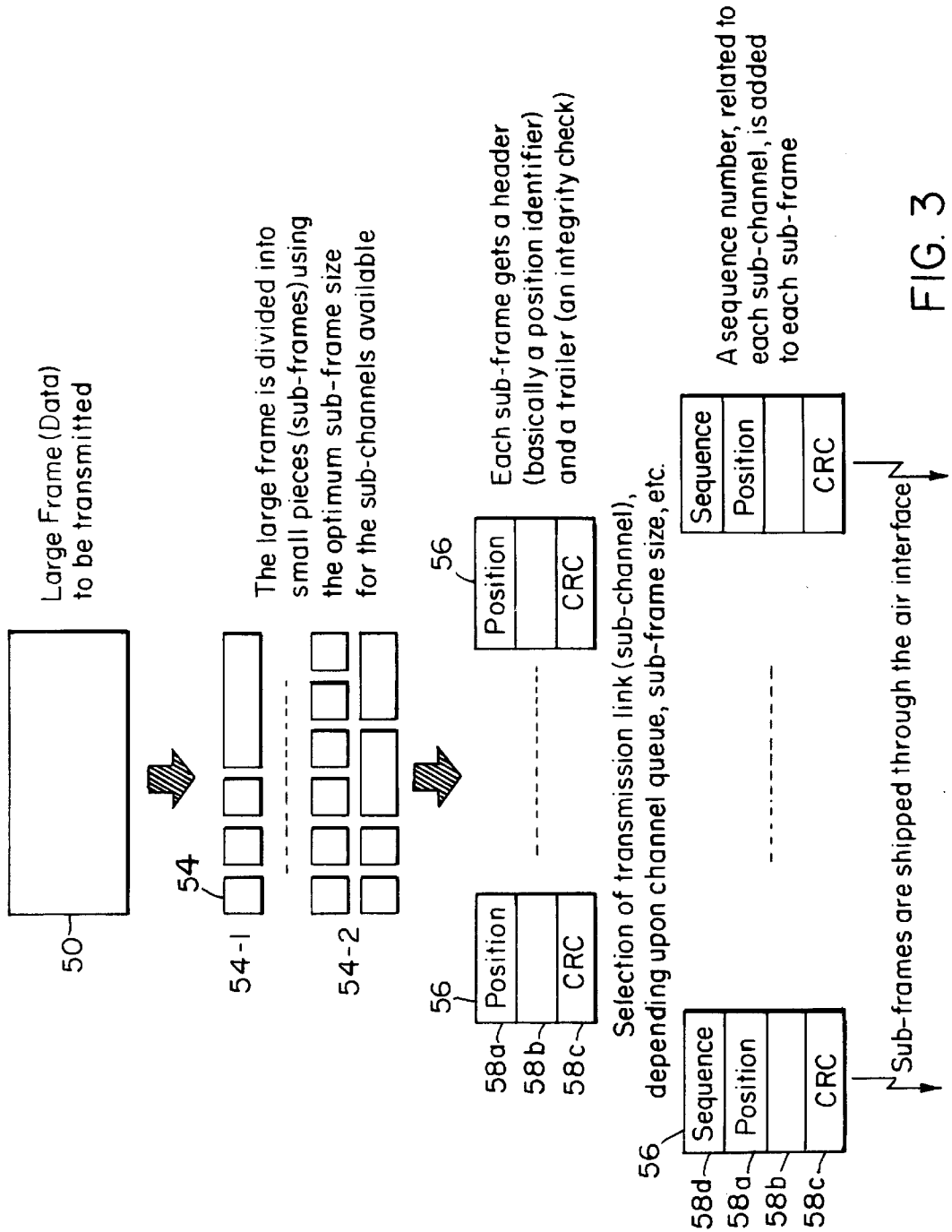
FIG. 3 is a more detailed diagram showing how network layer frames are divided into subframes by a protocol converter located at a sender.

Turning attention now more particularly to FIG. 3, the operations of the protocol converter 25 or 46 at the sender will be more particularly described. As shown, the input frame 50 as received from the network layer is relatively large, such as for example 1480 bits long, in the case of a TCP/IP frame.

The input frame 50 is first divided into a set of smaller pieces 54-1, 54-2. The size of the individual pieces 54 are chosen based upon the optimum subframe size for each of the channels 30 available. For example a bandwidth management function may make only a certain number of channels 30 available at any time. A subset of the available channels 30 is selected, and then the optimum number of bits for each subframe intended to be transmitted over respective one of the channels, is then chosen. Thus as illustrated in the figure, a given frame 54-1 may be divided into pieces associated with four channels. At a later time, there may be nine channels 30 available for a frame, with different optimum subframe sizes for the peice 54-2.

Each of the subframes 56 consists of a position identifier 58a, a data portion 58b, and a trailer typically in the form of an integrity checksum such as a cyclic redundancy check (CRC) 58c. The position identifier 58a for each subframe indicates the position within the associated larger frame 50.

The subframes 56 are then further prepared for transmission on each channel 30. This may be done by adding a sequence number related to each channel at the beginning of each subframe 56. The subframe 56 is then transmitted over the associated channel 30.

Figure 4:
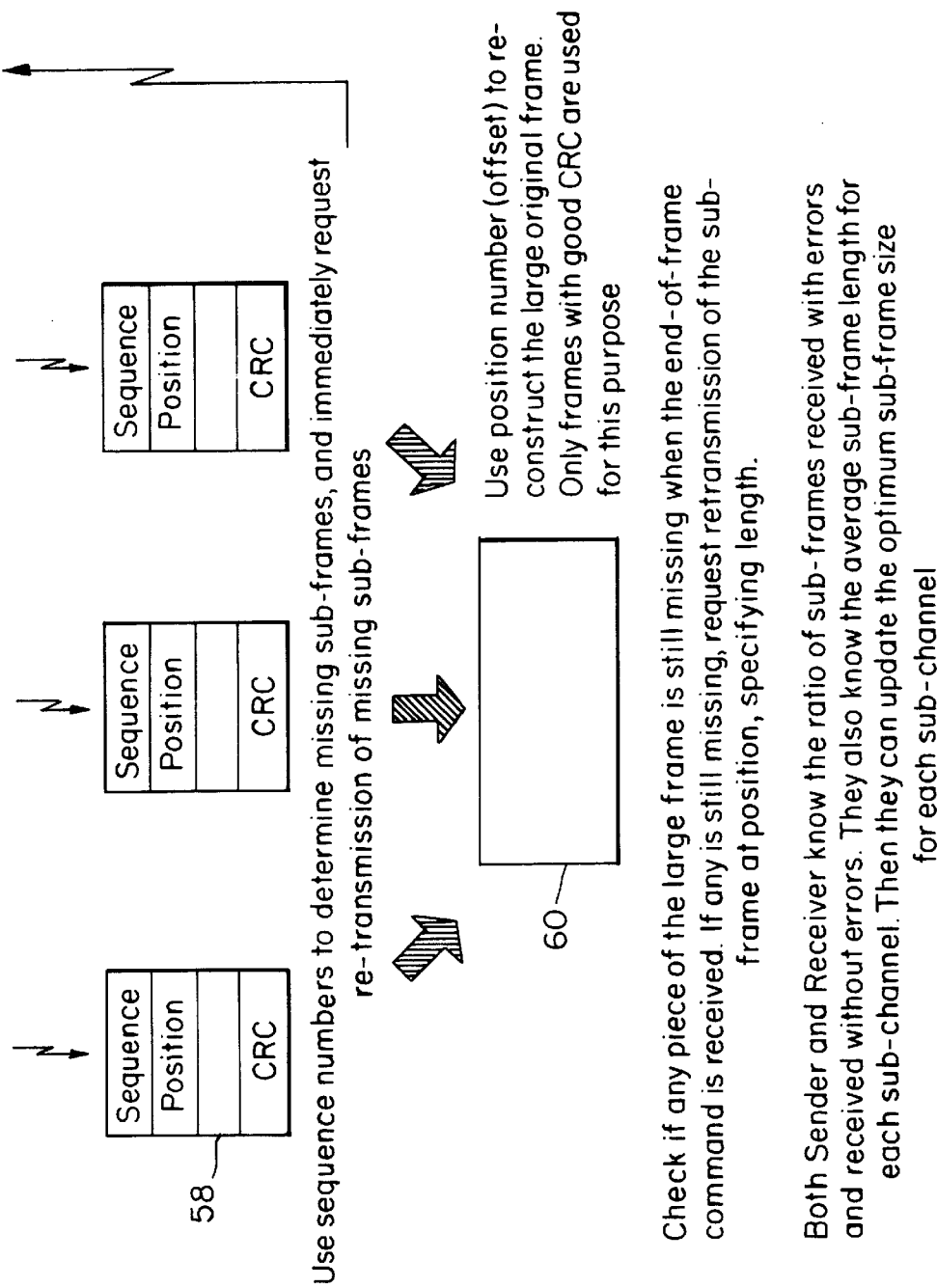
FIG. 4 is a continuation of the diagram of FIG. 3.

FIG. 4 illustrates the operations performed at the receive side. The subframes 56 are first received on the individual channels 30. A subframe 56 is discarded as received if the CRC portion 58c is not correct.

The sequence numbers 58d of the remaining frames 56 are then stripped off and used to determine whether any subframes 56 are missing. Missing subframes 56 can be detected by comparing the received sequence numbers 58d. If a sequence number is missing, it is assumed that the associated subframe 56 was not received properly. It should be understood that appropriate buffing of data and subframes 56 is typically required in order to properly receive the subframes 56 and determine if there are any missing sequence numbers depending upon the transmission rates, number of channels 30 and propagation delays in effect.

Upon the detection of a missing subframe 56, retransmission of the missed subframe is requested by the receiving end. At this point, the transmitting end reperforms transmission of the missing subframe.

Once all of the subframes 56 are received, the position number 58a is then used to arrange the data from the subframes 56 in the proper order to construct the output received frame 60.

At this point, also, if any piece of the large output frame 60 is still missing, such as when an end of frame command is encountered, retransmission of the corresponding subframe can also be requested at the indicated position, specifying a length for the missing piece.

Because of the use of both the position and sequence numbers, the sender and receiver know the ratio of the number of subframes received with errors to the number of frames received without errors. Also, the receiver and sender know the average subframe length for each channel. The optimum subframe size can thus be determined for each channel from these parameters as will be described more fully below.

Figure 5:
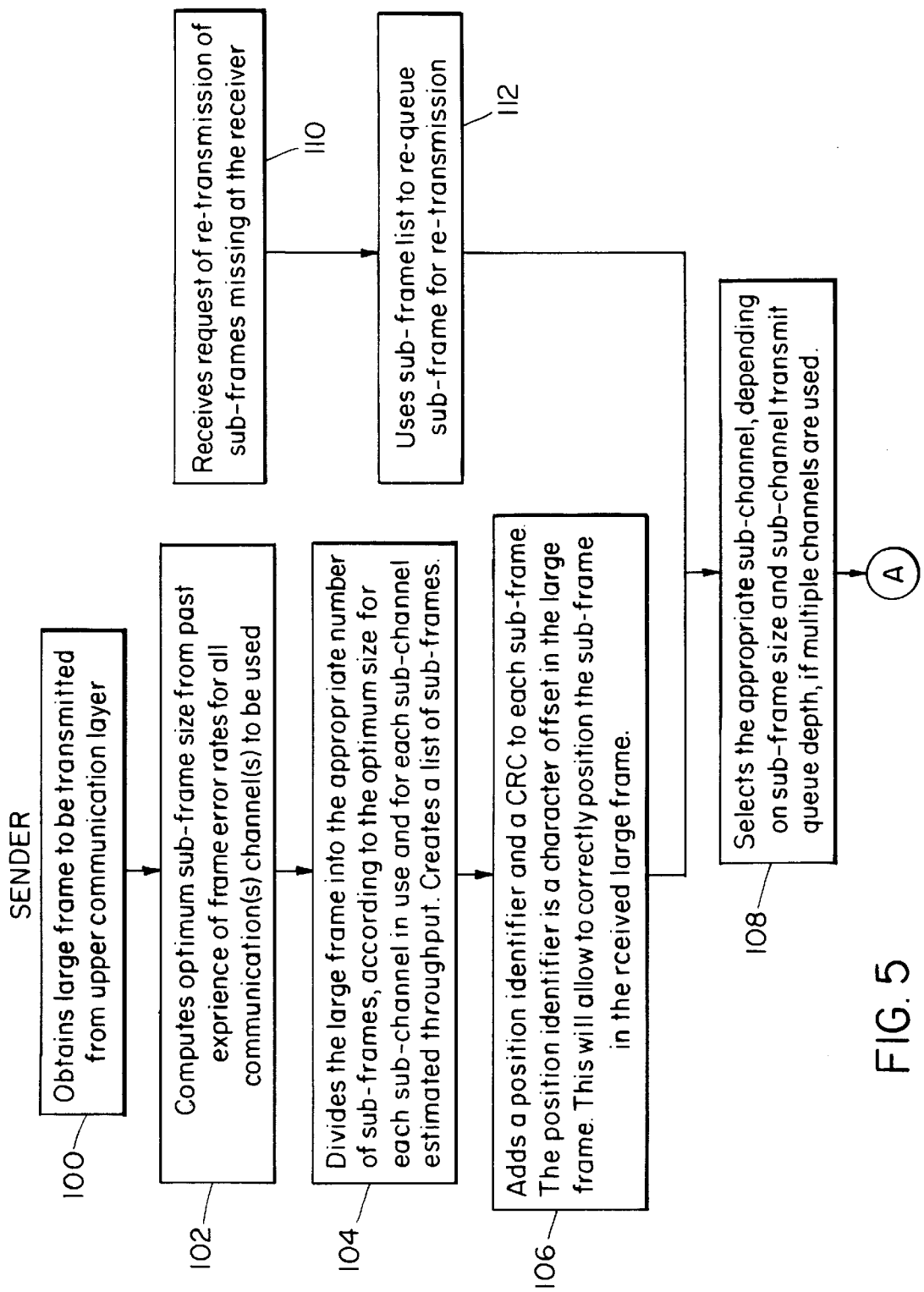
FIG. 5 is a series of steps performed by a protocol converter at the sender to implement the invention.

FIG. 5 is a more detailed flow diagram of a set of operations performed by the sender in order to implement the invention. In a first state 100, the frame 50 is obtained from an upper communication layer such as the network layer. In a next state 102, the sender computes an optimum subframe size from past observations of frame error rates on the individual channels 30, preferably calculating an optimum subframe size for all communication and channels available.

In a next state 104, the network layer frame 50 is divided into an appropriate number of subframes according to the optimum size for each associated channel available. This division is also based upon the available channel estimated throughput. A list of subframes is then created.

In a next state 106, a position identifier and a cyclic redundancy check (CRC) code are added to each subframe. The position identifier is an offset within the large frame 50 as described above, to allow correct positioning of the subframe when reconstructing the frame 50 at the receive end.

In a next state 108, an appropriate channel 30 is associated with each subframe depending upon the subframe size and transmit queue depth, if multiple channels are available.

Upon receipt of a retransmission request of a subframe missing at the receiver, a state 110 is entered in which an optimum subframe size is computed from the observed frame averages for the available communications channels 30. The subframe list is then used to requeue the subframe for retransmission in state 112. Processing then continues at state 108 for retransmission of the missing subframe.

Figure 6:
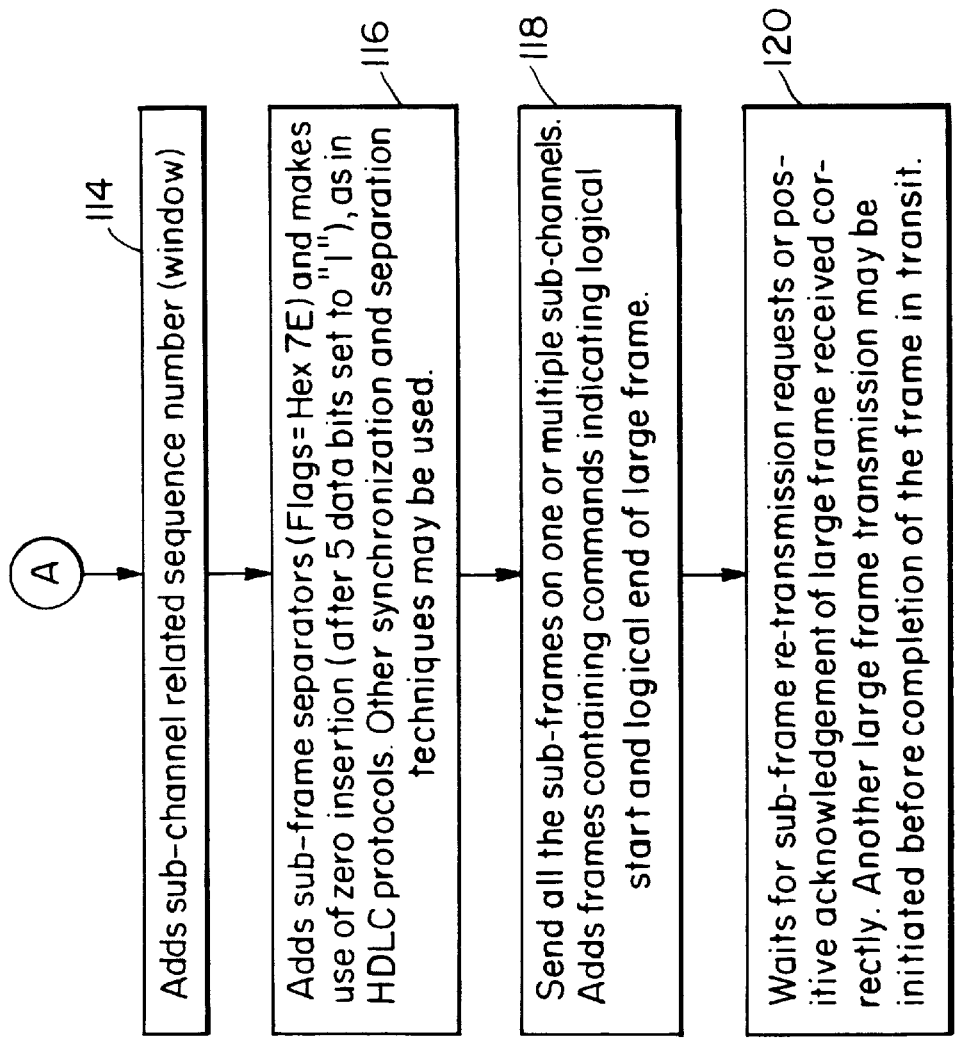
FIG. 6 is a continuation of the diagram of FIG. 5.

FIG. 6 shows the remainder of the steps performed at the sender.

In a state 114, a channel related sequence number is added to each subframe.

In a next state 116, subframe separators such as flags in the form "7E" are inserted into the subframes. In addition, any zero insertion such as setting data bits to a 1 after a sequence of five zeros, is performed. Other synchronization and separation and coding techniques may require that bits be inserted into the subframes at this point. For example, if a given channel 30 may make use of convolutional coding as specified by the IS-95 standard.

In a state 118, the subframes are sent on the available channels 30. Non-data frames such as logical start, logical end and other control frames may be inserted at this point as well.

In a final state 120, the sender operates on any subframe retransmission requests or positive acknowledgments of a large frame being received correctly. Another frame transmission may be indicated, for example, at this point before completion of a frame in transit.

Figure 7:
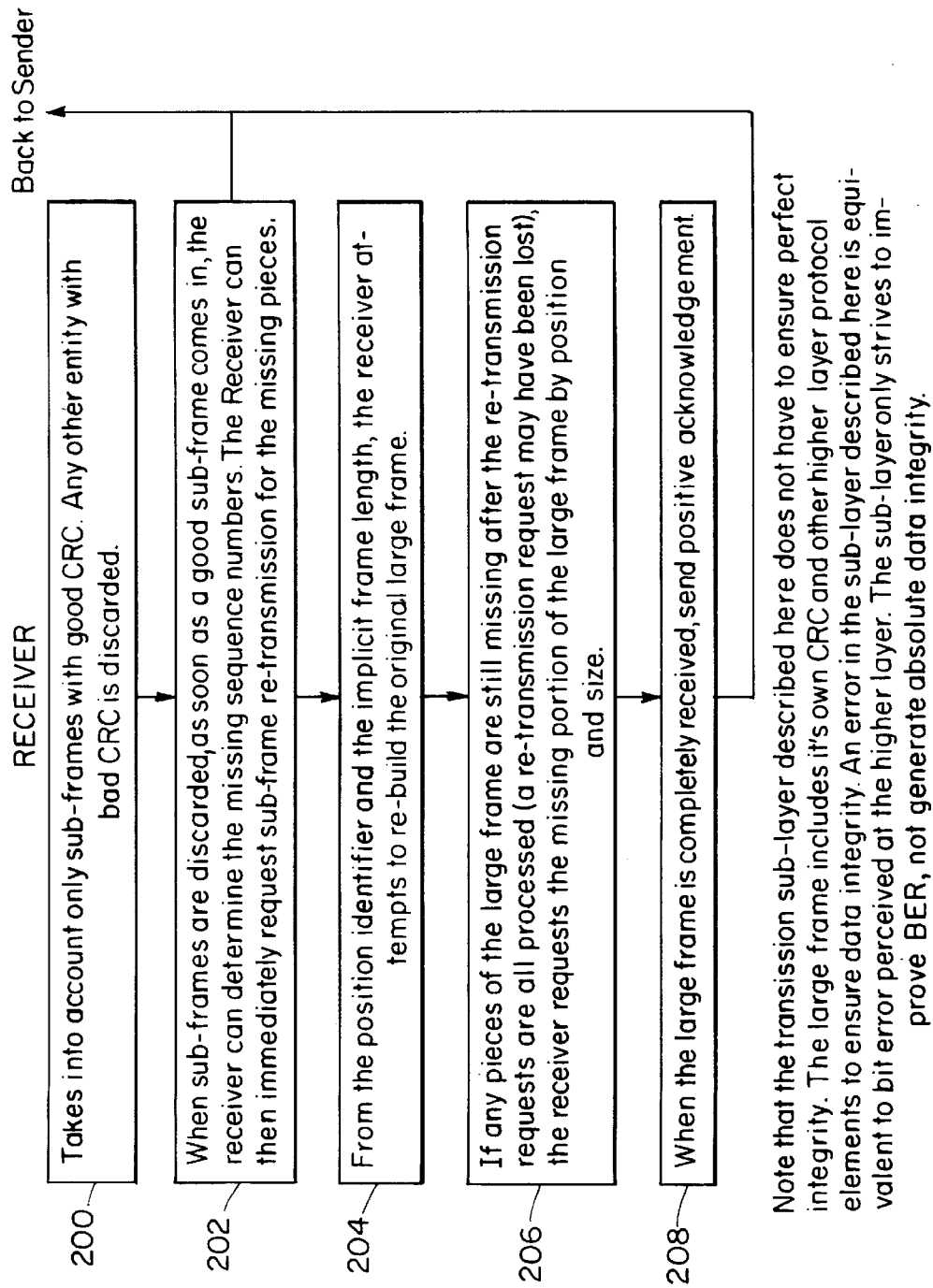
FIG. 7 is a diagram of the steps performed by a protocol converter located at a receiver to implement the invention.

FIG. 7 shows a detailed sequence of steps performed at the receiver. In a first state 200, the subframes are received. Any subframe with a good CRC is passed to the next following state 202. Any other received data entity with a bad CRC is discarded.

Continuing with state 202, the receiver determines any missing sequence numbers. The receiver then requests retransmission of a subframe for the missing pieces based upon sequence number by sending back a retransmission request to the sender.

In a next state 204, from the position identifier and the known length of each original frame 50, the receiver attempts to rebuild the original frame 50. In state 206, if any pieces of the frame 50 are still missing after the retransmission requests are all processed, accommodating the fact that a retransmission request itself may be lost, the receiver requests the missing portion of the large frame 50 by position and size.

In state 208, once the frame 50 is completely received, a positive acknowledgment is returned back to the sender.

FIG. 8 is a diagram illustrating the format of a typical subframe 56. The fields include a data/command field, a large frame sequence number field of two bits, a position (character) offset field of the subframe into the large frame, a channel sequence number, the data, a CRC field, and a shared subframe interframe flag. The data/command indicator and large frame sequence number field may each be comprised, for example, of one bit. The position offset of the subframe into the associated large frame may be 11 bits long. The channel sequence number may be 3 bits long. The data field varyies from 0 to 2048 bits long, the CRC field may be 12 bits, and the flag may be the standard hex value "7E" of 8 bits.

Returning to FIG. 5 briefly, as mentioned above, an optimum size is computed in state 102, given a frame error ratio, in order to optimizes the frame size. The objective is to improve the perceived bit error rate, assuming that a single bit error will destroy the integrity of a large frame maximizing the efficiency of a given channel 30. The efficiency is the ratio of the actual data bits versus all the data bits transmitted, including protocol elements such as CRC, zero insertions, frame separators and other overhead bits. Another objective is to extend the optimum efficiency in a multichannel environment where each channel may have a degree of efficiency different from the other channels.

The actual measurement of the number and position of bits in error is impractical and/or time consuming in most real systems. A single bit in error destroys frame integrity, but one or more bits in error in sequence most likely produced the same damage as a single bit. Conversely, a single bit in error in the middle of a synchronization flag destroys two frames. The number of bits in a frame, therefore, cannot be determined exactly without knowing the content of the frame, due to zero insertion.

However, one practical measurement available is R, the ratio of received good frames to received bad frames. By definition, a frame is in error because of a frame integrity destroying the event. Such an event can be a single bit in error or cluster of bits in error within a frame boundary. Regardless of how the error occurs, the optimum sub-frame size can be determined using the following equations, given information about the frame error rate. Consider first the following definitions:

G number of good bits received, on average, before a bit is received in error

H frame overhead, in bytes, including any shared frame synchronization flag (7E) between frames X number of data bytes in a frame B total number of bytes in a frame, including data plus overhead N number of original data frames; i.e., the number of frames generated by the sender F total number of frames transmitted, including bad frames and re-transmitted frames The frame error ratio, R, can be defined as:

$$R = F_{RB}/F_{RG} \quad (1)$$

where $F_{RB}$ is the number of frames observed to be received in error and $F_{RG}$ is the observed number of frames correctly received at the receive end.

After attempting the transmission of N frames, some of them are received correctly, and some will have been received in error. Some of the latter, in turn, will be re-transmitted, and require still further re-transmission. In general, $$F = N + N*R + (N*R)*R + (N*R*R)*R + \ldots \quad (2)$$

$$F = N*(1 + R^2 + R^3 + \ldots) \quad (3)$$

$$F = N/(1-R) \quad (4)$$

A normalized efficiency, $F_n$, can be defined for N=1 as:

$$F_n = 1/(1-R) \quad (5)$$

An efficiency of transmission, K, can in turn be defined as the ratio of data bytes to the total number of data bytes required to transmit the original data, including re-transmissions and frame overhead:

$$K = X/(B*F_n) \quad (6)$$

$$= \frac{X}{(X+H)/(1-R)} \quad (7)$$

$$= \frac{X*(1-R)}{(X+H)} \quad (8)$$

$$= \frac{X*(1-((X+H)*8/G))}{(X+H)} \quad (9)$$

$$= \frac{X - X*8*(X+H)/G}{(X+H)} \quad (10)$$

$$= \frac{X}{(X+H)} - \frac{X*8*(X+H)/G}{(X+H)} \quad (11)$$

$$= \frac{X}{(X+H)} - \frac{8*X}{G} \quad (12)$$

In order to optimize the efficiency of transmission, K, it is necessary to find the maximum of the above function. This can be done by setting the derivative of K to zero:

$$\frac{dK}{dX} = \frac{1}{X+H} * \frac{d}{dX}(X) - \frac{X}{(X+H)^2} * \frac{d}{dX}(X+H) - \frac{8}{G} * \frac{d}{dX}(X)$$

or $$0 = \frac{1}{(X+H)} - \frac{X}{(X+H)^2} - \frac{8}{G} \quad (14)$$

which, when multiplying by $(X+H)^2$ becomes:

$$X+H-X = (8/G)*(X+H)^2 \quad (15)$$

which can then be solved as $$X + H = \sqrt{G + H/8} \quad (16)$$

or $$(X+H)^2 = G*H/8. \quad (17)$$

This last equation opens the possibility of implementing an algorithm that optimizes the frame size knowing the bit error rate for a specific channel. Consider that the sender knows R (by counting the number of re-transmission requests), and also knows the current X and H used to pack frames. Redefining G as the average distance, in bits, between frame integrity destroying events, G can be derived as:

$$G = (X_{current} + H_{current})*8/R \quad (18)$$

By substituting this expression for G into equation (17) above of the optimization of (X+H), $$(X + H)^2 = \frac{(X_{current} + H_{current})*8}{R} * \frac{H}{8} \quad (19)$$

$$X = -H + \sqrt{(X_{current} + H_{current})*H/R} \quad (20)$$

This last equation is relatively straightforward to implement. The system 10 need only keep a filtered average of the number of frames transmitted successfully and the number of frames that did not go across the link. The number of data bytes in the new sub-frames are then adjusted according to the formula.

For practical purposes, there is no need for extreme accuracy in the optimization calculation since there is no guarantee that R remains constant over time. Actually, the purpose is to adapt to changes in the value of R, while still providing a frame size that optimizes the effective throughput during a period of time when only the measurement of an average for R makes sense.

Figures 9, 10:
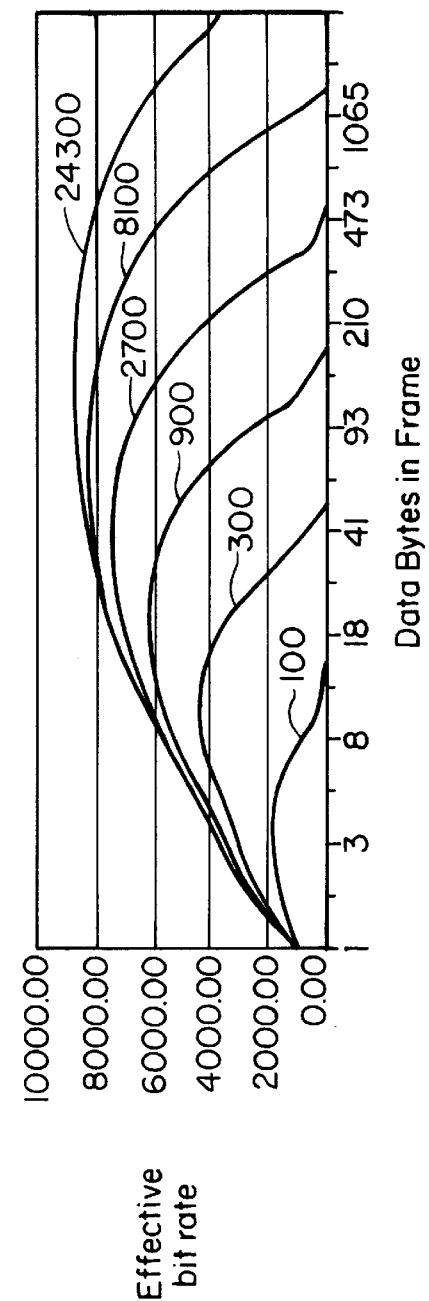
FIG. 9 is a chart illustrating how a particular example of how 20 twenty 9.6 kbps sub-channels with various bit error rates can be used to provide a 138 kbps overall effective transfer rate.
FIG. 10 is a plot of how the effective bit error rate changes as the number of data bytes in a subframe changes.

FIG. 9 is a chart showing the results of modelling the system chosing optimum frame lengths as described. The model illustrated that using a mixed set of channels 30, such as with two 9.6 kbps channels having an error every 50 bits, 5 channels having a bit error every 500 bits, and 13 channels having a bit error every 5000 bits, the system 10 can carry 138 kpbs data rate load with a perceived error rate of $10^{-6}$ or better.

FIG. 10 is a sets of curves of the overall effective bit error rate for subchannels operating at 9.6 kbps, assuming bit error rates of 1 bit in every 100, 300, 900, 2700, 8100 and 24300 bits, respectively. Note how that the peaks of the curves change depending upon the number of data bytes in a frame as well as the bit error rate.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A method for communication of data between a sender and a receiver over one or more communication channels, the data being provided in a frame, the method comprising the steps of:

(a) dividing a frame into subframes according to an optimum subframe size;

(b) sending the subframes over a communication channel;

(c) determining the number of subframes received in error at the receiver by counting the number of selective reject orders made to the sender; and (d) determining an optimum subframe size for the communication channel based upon a determined number of subframes received in error which were attempted to be communicated over that channel.

2. A method as in claim 1 wherein step (b) additionally comprises sending subframes over multiple distinct communication channels.

3. A method as in claim 2 wherein steps (c) and (d) additionally comprise determining an error rate in each channel and an optimum number of subframes for each channel individually.

4. A method as in claim 1 wherein step (d) determines an optimum number of frames according to a ratio of a number of subframes received in error to a number of subframes received correctly.

5. A method as in claim 1 wherein step (d) additionally comprises the step of determining an adjusted number of data bytes in a frame, X, from the formula:

$$X = \overline{-H + SQR(X_{current} + H_{current})} * H/R$$

where $X_{current}$ is the present number of data bytes in a frame, $H_{current}$ is the present frame overhead in bytes, H is the new overhead for the frame in bytes, and R is a ratio of subframes received in error to subframes received correctly.

6. A method as in claim 1 wherein step (d) additionally comprises the step of dynamically adjusting the optimum frame size as changes in transmission characteristics change the observed frame error rate.

7. A method as in claim 6 wherein step (d) additionally adjusts the frame size dynamically to optimize the effective throughput by determining a ratio of actual data transferred between the sender and receiver to the total number of bits of information, including frame overhead and re-transmissions.

8. A method as in claim 1 wherein step (b) additionally comprises the step of inserting a position number into the subframe to identify a position of the subframe within the frame.

9. A method as in claim 1 wherein step (b) additionally comprises the step of inserting a sequence number added into each subframe so that receiver can identify missing subframes.

10. A method as in claim 1 wherein step (d) additionally comprises the step of maintaining an average of the number of frames transmitted successfully between the sender and receiver and the number of frames that were not transmitted successfully.

11. A method for providing wireless communication of digital signals, the digital signals being communicated between a plurality of wireless subscriber units and a base station, the digital signals being communicated using at least one radio frequency channel via Code Division Multiple Access (CDMA) modulated radio signals, the digital signals also having a given nominal data rate, the method comprising the steps of:

(a) making available a plurality of subchannels within each CDMA radio channel, wherein a data rate of each subchannel is less than the nominal data rate of the digital signals;

(b) establishing a network layer session between terminal equipment connected to a subscriber unit through the base station to other terminal equipment connected to the base station; and (c) during the network layer session, allocating available subchannels on an as-needed basis, with the number of subchannels allocated thereby changing during the duration of a given session; and (d) dividing a network layer frame into subframes according to optimum subframe sizes for each subchannel.

12. A method as in claim 11 additionally comprising the step of:

(e) determining an optimum subframe size for each subchannel based upon a determined number of subframes received in error which were attempted to be communicated over that subchannel.

13. A method as in claim 12 wherein step (e) additionall comprises dynamically adjusting the frame size of a channel to optimize the effective throughput of the overall system based upon the ratio of actual data transferred to the number of bits actually used to carry information, including frame overhead and retransmissions.

14. A data communication system comprising:

a first multichannel transceiver to transmit data of a frame structure over one or more communication channels;

a second multichannel transceiver to receive the data of a frame structure over the one or more communication channels;

a first protocol converter connected to the first multichannel transceiver to divide a frame into subframes in an optimum subframe size; and a second protocol converter connected to the second multichannel transceiver to reassemble the subframes transmitted by the first multichannel transceiver and received by the second multichannel transceiver into the frame, to determine the number of subframes received in error at the second multichannel transceiver by counting the number of selective reject orders made to the first protocol converter, to determine the optimum subframe size for each communication channel based upon a determined number of subframes received in error which were attempted to be communicated over each channel, and to determine an error rate in each channel and an optimum number of subframes for each channel individually.

15. A system as in claim 14 wherein the second protocol converter further comprises:

means for determining an optimum number of frames according to a ratio of a number of subframes received in error to a number of subframes received correctly.

16. A system as in claim 14 wherein the second protocol converter further comprises:

means for determining an adjusted number of data bytes in a frame, X, from the formula:

$$X = \overline{-H + SQR(X_{current} + H_{current})} * H/R)$$

where $X_{current}$ is the present number of data bytes in a frame, $H_{current}$ is the present frame overhead in bytes, H is the new overhead for the frame in bytes, and R is a ratio of subframes received in error to subframes received correctly.

17. A system as in claim 14 wherein the first protocol converter further comprises:

means for adjusting the optimum frame size as changes in transmission characteristics change the an observed frame error rate.

18. A system as in claim 17 wherein the first protocol converter further comprises:

means for adjusting the frame size to optimize the effective throughput by determining a ratio of actual data transferred between the first multichannel transceiver and the second multichannel transceiver to the total number of bits of information, including frame overhead and re-transmissions.

19. A system as in claim 14 wherein the second protocol converter further comprises:

means for maintaining an average of the number of frames transmitted successfully between the first multichannel transceiver and the second multichannel transceiver and the number of frames that were not transmitted successfully.

* * * * *

UNITED STATES PATENT AND TRADEMARK OFFICE
CERTIFICATE OF CORRECTION

PATENT NO. : 6,236,647 B1
DATED : May 22, 2001
INVENTOR(S) : Carlo Amalfitano

Page 1 of 1

It is certified that error appears in the above-identified patent and that said Letters Patent is hereby corrected as shown below:

Column 11, claim 5,
Delete the formula and insert the following formula:

$$X = -H\sqrt{(X_{current} + H_{current})*H/R}$$

Column 12, claim 13,
Line 42, delete "additionall" and insert -- additional --.

Column 13, claim 16,
Delete the formula and insert the following formula:

$$X = -H\sqrt{(X_{current} + H_{current})*H/R}$$

Column 14, claim 17,
Line 2, delete "an".

Signed and Sealed this

Fifth Day of February, 2002

Attest:

Attesting Officer

JAMES E. ROGAN
*Director of the United States Patent and Trademark Office*